United States Patent
Griffin

(10) Patent No.: US 8,508,339 B2
(45) Date of Patent: *Aug. 13, 2013

(54) ASSOCIATING A BIOMETRIC REFERENCE TEMPLATE WITH AN IDENTIFICATION TAG

(75) Inventor: Phillip H. Griffin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,945

(22) Filed: Aug. 14, 2012

(65) Prior Publication Data

US 2012/0306616 A1    Dec. 6, 2012

Related U.S. Application Data

(63) Continuation of application No. 12/370,345, filed on Feb. 12, 2009, now Pat. No. 8,289,135.

(51) Int. Cl.
*G06F 7/04* (2006.01)
(52) U.S. Cl.
USPC ... 340/5.82; 340/5.81; 340/572.1; 340/572.4; 340/10.1; 713/185; 713/186; 235/384
(58) Field of Classification Search
USPC .......... 340/5.82, 5.81, 572.1, 10.1; 713/185, 713/186; 235/384
See application file for complete search history.

(56) References Cited

U.S. PATENT DOCUMENTS

| | | | |
|---|---|---|---|
| 5,467,081 A | 11/1995 | Drews et al. | |
| 5,649,099 A | 7/1997 | Theimer et al. | |
| 6,044,224 A | 3/2000 | Radia et al. | |
| 6,256,737 B1 | 7/2001 | Bianco et al. | |
| 6,554,188 B1 | 4/2003 | Johnson et al. | |
| 6,836,554 B1 | 12/2004 | Bolle et al. | |
| 7,030,760 B1 | 4/2006 | Brown | |
| 7,062,654 B2 | 6/2006 | Millen et al. | |
| 7,120,607 B2 | 10/2006 | Bolle et al. | |
| 7,298,243 B2 | 11/2007 | Juels et al. | |
| 7,302,583 B2 | 11/2007 | Forrest | |

(Continued)

FOREIGN PATENT DOCUMENTS

| | | |
|---|---|---|
| WO | 0065770 | 11/2000 |
| WO | 2005122467 | 12/2005 |

OTHER PUBLICATIONS

U.S. Appl. No. 13/611,000, filed Sep. 12, 2012.

(Continued)

*Primary Examiner* — Jennifer Mehmood
*Assistant Examiner* — Andrew Bee
(74) *Attorney, Agent, or Firm* — Schmeiser, Olsen & Watts, LLP; Matthew Chung

(57) ABSTRACT

A method and system for associating a biometric reference template with an identification tag for a physical object. A processor of a computer system ascertains that an attribute included in the identification tag is signed with a digital signature. The attribute includes a privacy policy identifier which identifies a privacy policy pertaining to the identification tag. The identification tag is embedded in or attached to a physical object. The identification tag includes a first biometric reference template identifier that uniquely identifies biometric data pertaining to a person. The biometric reference template includes a second biometric reference template identifier that uniquely identifies the biometric data. The processor confirms that the digital signature matches a signature stored in a database of the computer system. The processor verifies that the first biometric reference template identifier matches the second biometric reference template identifier.

20 Claims, 9 Drawing Sheets

(56) References Cited

U.S. PATENT DOCUMENTS

| | | | |
|---|---|---|---|
| 7,310,734 | B2 | 12/2007 | Boate et al. |
| 7,627,895 | B2 | 12/2009 | Gifford et al. |
| 7,671,746 | B2 | 3/2010 | Martinez de Velasco Cortina et al. |
| 7,739,744 | B2 | 6/2010 | Burch et al. |
| 7,788,500 | B2 | 8/2010 | Okamura et al. |
| 7,936,905 | B2 | 5/2011 | Takahashi |
| 8,001,387 | B2 | 8/2011 | Lee et al. |
| 8,086,867 | B2 | 12/2011 | Freeman et al. |
| 8,242,892 | B2 | 8/2012 | Griffin |
| 2002/0026582 | A1 | 2/2002 | Futamura et al. |
| 2002/0100803 | A1 | 8/2002 | Sehr |
| 2002/0174010 | A1 | 11/2002 | Rice |
| 2003/0088782 | A1 | 5/2003 | Forrest |
| 2003/0093666 | A1 | 5/2003 | Millen et al. |
| 2003/0097383 | A1 | 5/2003 | Smirnov et al. |
| 2003/0115490 | A1 | 6/2003 | Russo et al. |
| 2003/0126433 | A1 | 7/2003 | Hui |
| 2003/0129965 | A1 | 7/2003 | Siegel |
| 2003/0189094 | A1 | 10/2003 | Trabitz |
| 2004/0019570 | A1 | 1/2004 | Bolle et al. |
| 2004/0020984 | A1 | 2/2004 | Clark |
| 2004/0123114 | A1 | 6/2004 | McGowan |
| 2004/0162984 | A1 | 8/2004 | Freeman et al. |
| 2004/0193893 | A1 | 9/2004 | Braithwaite et al. |
| 2005/0005136 | A1 | 1/2005 | Chen et al. |
| 2005/0038718 | A1 | 2/2005 | Barnes et al. |
| 2005/0055582 | A1 | 3/2005 | Bazakos et al. |
| 2005/0088320 | A1 | 4/2005 | Kovach |
| 2005/0180619 | A1 | 8/2005 | McClurg et al. |
| 2005/0198508 | A1 | 9/2005 | Beck |
| 2005/0229007 | A1 | 10/2005 | Bolle et al. |
| 2005/0240778 | A1 | 10/2005 | Saito |
| 2005/0283614 | A1 | 12/2005 | Hardt |
| 2006/0078171 | A1 | 4/2006 | Govindaraju et al. |
| 2006/0090079 | A1 | 4/2006 | Oh et al. |
| 2006/0104484 | A1 | 5/2006 | Bolle et al. |
| 2006/0158751 | A1 | 7/2006 | McClurg et al. |
| 2006/0200683 | A1 | 9/2006 | King |
| 2006/0206723 | A1 | 9/2006 | Gil et al. |
| 2006/0267773 | A1 | 11/2006 | Roque |
| 2006/0289648 | A1 | 12/2006 | Shafer |
| 2007/0040654 | A1 | 2/2007 | Lee et al. |
| 2007/0040693 | A1 | 2/2007 | Medve et al. |
| 2007/0044139 | A1 | 2/2007 | Tuyls et al. |
| 2007/0119924 | A1 | 5/2007 | Register, Jr. et al. |
| 2007/0136581 | A1 | 6/2007 | Hoghaug et al. |
| 2007/0164863 | A1 | 7/2007 | Himberger et al. |
| 2007/0180261 | A1 | 8/2007 | Akkermans et al. |
| 2007/0226512 | A1 | 9/2007 | Kevenaar et al. |
| 2007/0243932 | A1 | 10/2007 | Rothschild et al. |
| 2008/0024271 | A1 | 1/2008 | Oberman et al. |
| 2008/0037833 | A1 | 2/2008 | Takahashi et al. |
| 2008/0065895 | A1 | 3/2008 | Liu et al. |
| 2008/0072284 | A1 | 3/2008 | Horvitz et al. |
| 2008/0130882 | A1 | 6/2008 | Hagglund et al. |
| 2008/0157927 | A1 | 7/2008 | Soppera et al. |
| 2008/0162943 | A1 | 7/2008 | Ali et al. |
| 2008/0169909 | A1 | 7/2008 | Park et al. |
| 2009/0022374 | A1 | 1/2009 | Boult |
| 2009/0027207 | A1 | 1/2009 | Shelton et al. |
| 2009/0271635 | A1 | 10/2009 | Liu et al. |
| 2010/0201489 | A1 | 8/2010 | Griffin |
| 2010/0201498 | A1 | 8/2010 | Griffin |
| 2010/0205431 | A1 | 8/2010 | Griffin |
| 2010/0205452 | A1 | 8/2010 | Griffin |
| 2010/0205658 | A1 | 8/2010 | Griffin |
| 2010/0205660 | A1 | 8/2010 | Griffin |
| 2010/0332838 | A1 | 12/2010 | Zhu et al. |

OTHER PUBLICATIONS

Amendment After Final filed Sep. 12, 2012 in response to Final Office Action (Mail Date Jul. 13, 2012) for U.S. Appl. No. 12/370,350, filed Feb. 12, 2009.

Request for Continued Examination filed Aug. 14, 2012 for U.S. Appl. No. 12/370,379, filed Feb. 12, 2009.

Supplemental Amendment filed May 24, 2012 in response to Advisory Action (Mail Date May 14, 2012) for U.S. Appl. No. 12/370,345, filed Feb. 12, 2009.

Ratha, et al.; Generating Cancelable Fingerprint Templates; IEEE Transactions on Pattern Analysis and Machine Intelligence; vol. 29, No. 4; Apr. 2007; pp. 561-572.

Molnar, et al.; Privacy for RFID Through Trusted Computing; WPES '05; Nov. 7, 2005; Alexandria, Virginia; pp. 31-34.

Juels, et al.; Soft Blocking: Flexible Blocker Tags on the Cheap; WPES '04; Oct. 28, 2004; Washington, D.C.; pp. 1-7.

Office Action (Mail Date Nov. 9, 2011) for U.S. Appl. No. 12/370,359, filed Feb. 12, 2009.

Amendment filed Feb. 9, 2012 in response to Office Action (Mail Date Nov. 9, 2011) for U.S. Appl. No. 12/370,359, filed Feb. 12, 2009.

Office Action (Mail Date Nov. 17, 2011) for U.S. Appl. No. 12/370,365, filed Feb. 12, 2009.

Amendment filed Feb. 9, 2012 in response to Office Action (Mail Date Nov. 17, 2011) for U.S. Appl. No. 12/370,365, filed Feb. 12, 2009.

Office Action (Mail Date Sep. 27, 2011) for U.S. Appl. No. 12/370,379, filed Feb. 12, 2009.

Amendment filed Dec. 22, 2011 in response to Office Action (Mail Date Sep. 27, 2011) for U.S. Appl. No. 12/370,379, filed Feb. 12, 2009.

Office Action (Mail Date Mar. 6, 2012) for U.S. Appl. No. 12/370,334, filed Feb. 12, 2009.

Amendment filed Jun. 4, 2011 in response to Office Action (Mail Date Mar. 6, 2012) for U.S. Appl. No. 12/370,334, filed Feb. 12, 2009.

Notice of Allowance (Mail Date Jul. 26, 2012) for U.S. Appl. No. 12/370,334, filed Feb. 12, 2009.

ITU-T Telecommunication Standardization Sector of ITU, X.667, Series X: Data Networks and Open System Communications—OSI networking and system aspects—Abstract Syntax Notation One (ASN.1 ), ISO/IEC 8824-1:2003 (E), 146 pages, Geneva, Switzerland 2005.

Griffin, P., ISO 19092: A Standard for Biometric Security Management, ISSA Journal, Jan. 2007, pp. 20-23.

Berners-Lee, T. et al., Uniform Resource Identifiers (URI): Generic Syntax, RFC 2396, http: //ietfreport.isoc. org/rfc/.

ITU-T Telecommunication Standardization Sector of ITU, X.667, Series X: Data Networks and Open 1 System Communications - OSI networking and system aspects- Naming, Addressing and Registration, ISO/IEC D 9834-8: 2005 (E), 34 pages, Geneva, Switzerland 2005.

Notice of Allowance (Mail Date Jun. 21, 2012) for U.S. Appl. No. 12/370,359, filed Feb. 12, 2009.

Office Action (Mail Date Nov. 1, 2011) for U.S. Appl. No. 12/370,345, filed Feb. 12, 2009.

Amendment filed Jan. 30, 2012 in response to Office Action (Mail Date Nov. 1, 2011) for U.S. Appl. No. 12/370,345, filed Feb. 12, 2009.

Final Office Action (Mail Date Mar. 9, 2012) for U.S. Appl. No. 12/370,345, filed Feb. 12, 2009.

Amendment after Final file May 8, 2012 in response to Final Office Action (Mail Date Mar. 9, 2012) for U.S. Appl. No. 12/370,345, filed Feb. 12, 2009.

Advisory Action (Mail Date May 14, 2012) for U.S. Appl. No. 12/730,345, filed Feb. 12, 2009.

Notice of Allowance (Mail Date May 30, 2012) for U.S. Appl. No. 12/370,345, filed Feb. 12, 2009.

Office Action (Mail Date Mar. 13, 2012) for U.S. Appl. No. 12/370,350, filed Feb. 12, 2009.

Amendment filed Jun. 12, 2012 in response to Office Action (Mail Date Mar. 13, 2012) for U.S. Appl. No. 121370,350, filed Feb. 12, 2009.

Final Office Action (Mail Date Jul. 13, 2012) for U.S. Appl. No. 12/370,350, filed Feb. 12, 2009.
Notice of Allowance (Mail Date Mar. 30, 2011) for U.S. Appl. No. 12/370,365, filed Feb. 12, 2009.
Final Office Action (Mail Date May 14, 2012) for U.S. Appl. No. 12/370,379, filed Feb. 12, 2009.
Amendment filed Jul. 13, 2012 in response to Final Office Action (Mail Date May 14, 2012) for U.S. Appl. No. 12/370,379, filed Feb. 12, 2009.
Advisory Action (Mail Date Jul. 26, 2012) for U.S. Appl. No. 12/370,379, filed Feb. 12, 2009.

ASSOCIATING A BIOMETRIC REFERENCE TEMPLATE WITH AN IDENTIFICATION TAG

This application is a continuation application claiming priority to Ser. No. 12/370,345, filed Feb. 12, 2009, now U.S. Pat. No. 8,289,135, issued Oct. 16, 2012.

FIELD OF THE INVENTION

The present invention relates to computer systems and software, and more specifically to a technique for associating a biometric reference template corresponding to an individual with a Radio Frequency Identification (RFID) tag embedded in or attached to a physical object.

BACKGROUND OF THE INVENTION

Biometric reference templates can be uniquely identified and associated with the identity of a person or individual. The biometric data component of a template is a constant that identifies an individual. Exposure of a reference template over time, when aggregated with other information, provides a footprint of activities that the individual participated in (such as, making a purchase in a store, clocking in and out of work, paying a highway toll) and the locations of that individual at various points in time (such as, when they were at a particular banking machine, toll booth, or store's check-out register). Similarly, data transmitted using a portable Radio Frequency Identification (RFID) tag may be used to uniquely identify a physical object, its location, or its characteristics, for instance, its color, shape, size, etc. An object containing an RFID tag can be used to identify or locate an individual associated with the object. Currently, there is no standardized means for providing relationships between a RFID tag and biometric data pertaining to an individual. As such, there is a need for providing relationships between a RFID tag and biometric data pertaining to an individual, without threatening the privacy of the individual.

SUMMARY OF THE INVENTION

The present invention resides in a system, method and program product for associating a biometric reference template corresponding to an individual with a Radio Frequency Identification (RFID) tag embedded in or attached to a physical object, in accordance with an embodiment of the invention. The method for associating a biometric reference template with a physical object includes coupling an identification tag having a unique tag identifier to a physical object to be associated with an individual, the identification tag includes stored data and information pertaining to the physical object, providing a biometric reference template having a unique biometric reference template identifier that uniquely identifies biometric data pertaining to the individual and forming an association between the biometric reference template and the identification tag, where the association provides a relationship between the physical object and the individual and indicates the type of relationship and where said association includes a type of relationship. In an embodiment, the forming step further includes creating a biometric attribute in the identification tag for identifying the unique biometric reference template identifier for the biometric reference template belonging to the individual, where the biometric attribute created in the identification tag supplies an association between the physical object and the biometric reference template of the individual. In an embodiment, the forming step includes creating a tag attribute in the biometric reference template for identifying the unique tag identifier for the physical object, where the tag attribute created in the biometric reference template supplies an association between the physical object and the biometric reference template of the individual. The method further includes cryptographically binding the biometric attribute to the identification tag, where the biometric attribute is cryptographically bound to the identification tag using at least one of: a hash, a digital signature, Message Authentication Code (MAC) and encryption. The method further includes cryptographically binding the tag attribute to the biometric reference template, where the tag attribute is cryptographically bound to the identification tag using at least one of: a hash, a digital signature, Message Authentication Code (MAC) and encryption. The method further includes cryptographically binding the tag attribute to the biometric reference template, where the tag attribute is cryptographically bound to the identification tag using at least one of: a hash, a digital signature, Message Authentication Code (MAC) and encryption and cryptographically binding the biometric attribute to the identification tag, where the biometric attribute is cryptographically bound to the identification tag using at least one of: a hash, a digital signature, Message Authentication Code (MAC) and encryption. In an embodiment, the identification tag includes a Radio Frequency IDentification (RFID) tag and where the biometric data includes at least one of physiological traits and behavioral traits.

In another aspect, the invention provides a computer system for associating a biometric reference template with an identification tag for a physical object. The computer system includes a network communications channel, an identification tag system having a central processing unit and coupled to the network communications channel, the identification tag system coupling at least one identification tag to a physical object, the identification tag having a unique tag identifier for identifying the physical object, a biometric system having a central processing unit and coupled to the network communications channel, the biometric system creating a biometric reference template having a unique biometric reference template identifier that uniquely identifies biometric data pertaining to an individual, an attribute tool for creating one or more attributes for the biometric reference template and for the identification tag and an association tool for forming an association between the biometric reference template and the identification tag, where the association provides a relationship between the physical object and the individual. The computer system further includes an authentication tool for signing the one or more attributes created for the biometric reference template and the identification tag. In an embodiment, the unique biometric reference template identifier for the biometric reference template belonging to the individual is identified in a biometric attribute created in the identification tag and where the biometric attribute created in the identification tag supplies an association between the physical object and the biometric reference template of the individual, and where said association includes a type of relationship. In an embodiment, the unique tag identifier for the physical object is identified in a tag attribute created in the biometric reference template and where the tag attribute created in the biometric reference template supplies an association between the physical object and the biometric reference template of the individual. In an embodiment, the tag attribute is cryptographically bound to the biometric reference template using at least one of: a hash, a digital signature, Message Authentication Code (MAC) and encryption and where the biometric attribute is cryptographically bound to the identification tag using at least one of: a hash, a digital signature, Message Authentication Code (MAC) and encryption. In an embodiment, the identification tag includes a Radio Frequency IDentification (RFID) tag and where the biometric data includes at least one of physiological traits and behavioral traits. In an embodiment, an instance of the identification tag is associated with one or more instances of the biometric reference template and where an instance of the biometric reference template is associated with one or more instances of the identification tag.

In yet another aspect, the invention provides a computer program product for associating a biometric reference template with an identification tag for a physical object. The computer program product includes a computer readable storage medium, first program instructions to couple an identification tag having a unique tag identifier to a physical object to be associated with an individual, the identification tag including stored data and information pertaining to the physical object, second program instructions to provide a biometric reference template having a unique biometric reference template identifier that uniquely identifies biometric data pertaining to the individual and third program instructions to create an association between the biometric reference template and the identification tag, where the association provides a relationship between the physical object and the individual, the association including a type of relationship, and where the first, second and third program instructions are recorded on the computer readable storage medium. In an embodiment, the third program instructions further include instructions to create a biometric attribute in the identification tag for identifying the unique biometric reference template identifier for the biometric reference template belonging to the individual, where the biometric attribute created in the identification tag provides the relationship between the physical object and the individual. In an embodiment, the third program instructions further include instructions to create a tag attribute in the biometric reference template for identifying the unique tag identifier for the identification tag coupled to the object, where the tag attribute created in the biometric reference template provides the relationship between the physical object and the individual. In an embodiment, the third program instructions further include instructions to create a biometric attribute in the identification tag for identifying the unique biometric reference template identifier for the biometric reference template belonging to the individual and to create a tag attribute in the biometric reference template for identifying the unique tag identifier for the identification tag coupled to the object, where the biometric attribute created in the identification tag provides the relationship between the physical object and the individual and where the tag attribute created in the biometric reference template provides the relationship between the physical object and the individual. In an embodiment, the third program instructions include instructions to cryptographically bind the biometric attribute to the identification tag, where the biometric attribute is cryptographically bound to the identification tag using at least one of: a hash, a digital signature, Message Authentication Code (MAC) and encryption. In an embodiment, the third program instructions include instructions to cryptographically bind the tag attribute to the biometric reference template, where the tag attribute is cryptographically bound to the biometric reference template using at least one of: a hash, a digital signature, Message Authentication Code (MAC) and encryption.

Further, in yet another aspect, the invention provides a process for deploying computing infrastructure includes integrating computer-readable code into a computing system, where the code in combination with the computing system is capable of performing a process for associating a biometric reference template with an identification tag for a physical object communicating data and information, the process includes coupling an identification tag having a unique tag identifier to a physical object to be associated with an individual, the identification tag includes stored data and information pertaining to the physical object, providing a biometric reference template having a unique biometric reference template identifier that uniquely identifies biometric data pertaining to the individual, forming an association between the biometric reference template and the identification tag and storing the association in a storage, where the association provides a relationship between the physical object and the individual, and where said association includes a type of relationship. In an embodiment, the forming step further includes creating a biometric attribute in the identification tag for identifying the unique biometric reference template identifier for the biometric reference template belonging to the individual, where the biometric attribute created in the identification tag supplies an association between the physical object and the biometric reference template of the individual. In an embodiment, the forming step further includes creating a tag attribute in the biometric reference template for identifying the unique tag identifier for the physical object, where the tag attribute created in the biometric reference template supplies an association between the physical object and the biometric reference template of the individual. The process further includes cryptographically binding the tag attribute to the biometric reference template, where the tag attribute is cryptographically bound to the identification tag using at least one of: a hash, a digital signature, Message Authentication Code (MAC) and encryption. The process further includes cryptographically binding the biometric attribute to the identification tag, where the biometric attribute is cryptographically bound to the identification tag using at least one of: a hash, a digital signature, Message Authentication Code (MACs) and encryption.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1:
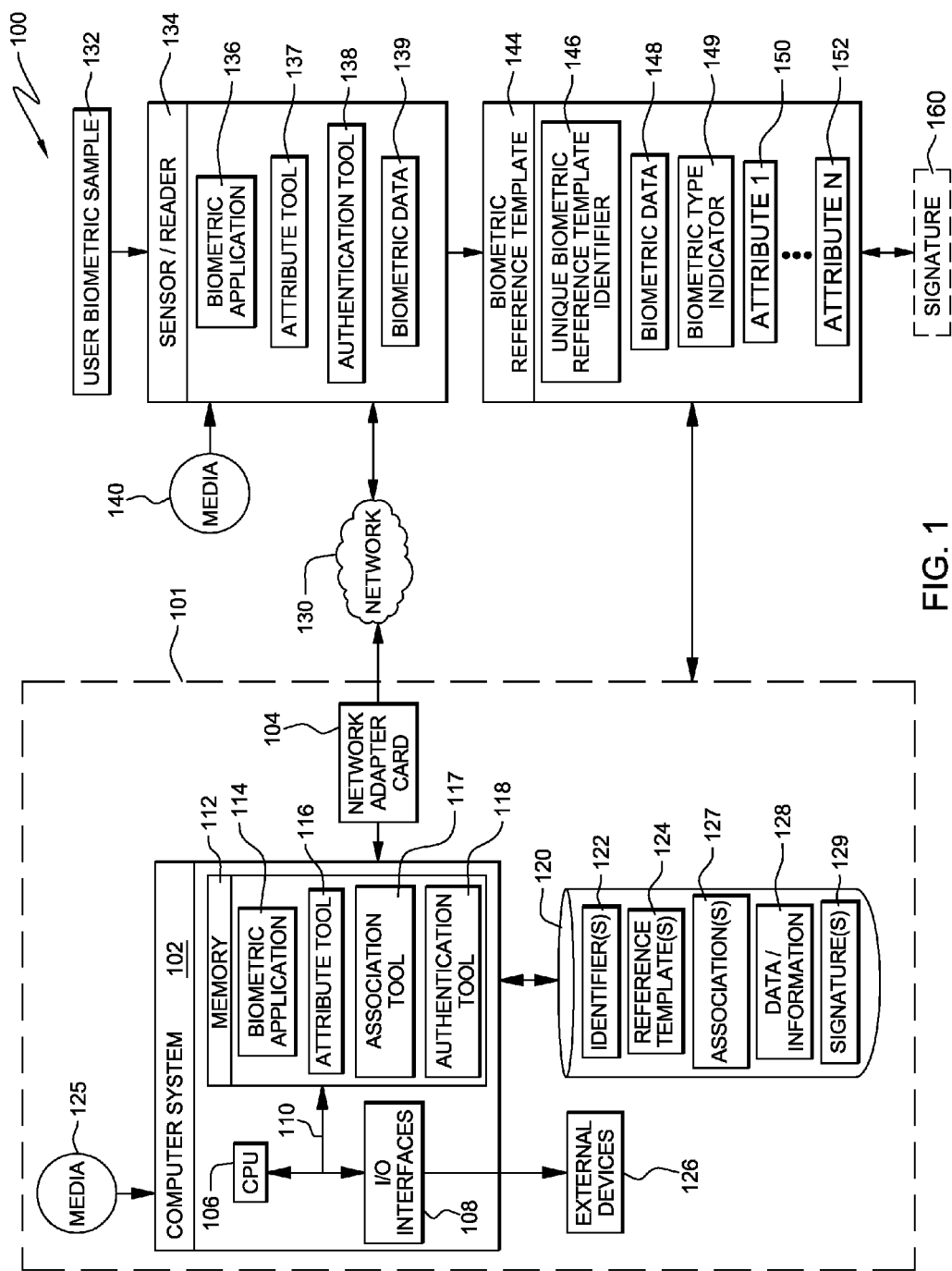
FIG. 1 is a block diagram depicting an embodiment of a computer infrastructure having a biometric application for associating a biometric reference template created, using a biometric sample collected from an individual, with a physical object, in accordance with an embodiment of the present invention.

In one embodiment, the invention provides a biometric infrastructure 100 that includes a biometric computer system 102 for creating a biometric reference template from a biometric sample collected for an individual, which is to be associated with a Radio Frequency Identification (RFID) tag (also referred to herein as "RFID tag" or "RFID" or simply as "tag") attached or embedded in a physical object, such that, the association provides a unique relationship between the individual and the object, in accordance with an embodiment of the invention. In an embodiment, as depicted in FIG. 1, computer system or server 102 is intended to represent any type of computer system that is maintained in a secure environment, that is, for which access control is enforced (as represented by the dotted lines indicated by reference numeral 101). Referring to FIG. 1, the computer system or server 102 is shown to include a CPU (Central CPU) 106, a memory 112, a bus 110, and input/output (I/O) interfaces 108. Further, the computer system or server 102 is shown in communication with external I/O devices/resources 126 and database 120. In general, CPU 106 executes computer program code stored in memory 112, such as the biometric application 114 for processing biometric data contained in a biometric sample 132. In an embodiment, the biometric application 114 deployed on the computer system 102 is loaded into memory 112 of the computer system 102 from a computer readable storage medium or media (reference numeral 125), such as, a magnetic tape or disk, optical media, DVD, memory stick, semiconductor memory, etc. or downloaded from the server via a network adapter card (reference numerals 104) installed on the computer system or server 102. Further, the memory 112 stores an attribute tool 116 for creating or defining one or more attributes to be included in the biometric reference template (also referred to herein as simply "biometric reference template" or "reference template" or "base template" or "base reference template") that is created using an individual's biometric sample, as discussed further herein below. In addition, the memory 112 has deployed thereon an association tool 117 for creating associations between a biometric reference template and a physical object, as explained further herein below. Further, the memory 112 stores an authentication tool 118 for signing biometric reference templates and/or attributes associated with the biometric reference templates. In an embodiment, the biometric reference template 144 that is created using a biometric sample 132 collected from an individual is stored in the database 120 (shown as reference numeral 124) within biometric system or server 102. In an embodiment, one or more unique identifier(s) 122, for instance, unique biometric reference template identifiers that uniquely identify respective biometric reference templates 124 are stored in database 120. Further, in an embodiment, any biometric data 128 and/or information processed by the biometric sensor or reader device 134 are transmitted over the network 130 to the computer system or server 102 for storage in database 120. Furthermore, in an embodiment, any associations 127 formed using the association tool 117 are stored in database 120. In an embodiment, an association 127 specifies the type of association between the biometric reference template and any other information object, such as, a unique tag identifier for a identification tag, as explained further herein below. Moreover, a digital signature 129 used to sign a biometric reference template is stored with other digital signatures in database 120. In particular, as shown in FIG. 1, a user or individual provides a biometric sample 132 using a biometric sensor or a biometric reader or scanning device 134 coupled to the biometric system 102. In an embodiment, the biometric sensor or reader or scanner 134 converts the scanned user biometric sample 132 to a digital form using an instance 136 of the biometric application 114 deployed on computer system 102. In an embodiment, an instance 136 of the biometric application 114 deployed on the computer system 102 is loaded into the sensor or reader device 134 within the biometric infrastructure 100 from a computer readable storage medium or media (reference numeral 140), such as, a magnetic tape or disk, optical media, DVD, memory stick, semiconductor memory, etc. or downloaded from the server via a network adapter card (reference numerals 104) installed on the computer system or server 102. Similarly, an instance 137 of the attribute tool 116 and an instance 138 of the authentication tool 118 are loaded into the sensor or reader device 134 within the biometric infrastructure 100 from a computer readable storage medium or media (reference numeral 140), such as, a magnetic tape or disk, optical media, DVD, memory stick, semiconductor memory, etc. or downloaded from the server using a network adapter card (reference numerals 104) installed on the computer system or server 102 coupled to network 130. In particular, the instance 136 of the biometric application 114 loaded into the biometric sensor or reader device 134 is used to process the biometric sample 132 collected from a person or an individual or user into biometric data 139, which, in an embodiment, is stored within the biometric sensor or reader device 134. Further, the biometric data 139 processed by the sensor or reader device 134 is used to create a biometric reference template 144. In an embodiment, the sensor or reader device 134 uses the attribute tool or program 137 for creating one or more attributes to be associated with or attached to the biometric reference template 144. Further, the sensor or reader device 134 uses the authentication tool or program 138 for signing the biometric reference templates that are created in the system. Further, the authentication tool 138 is used to sign any attributes that are associated with and/or included in a biometric reference template 144. In an embodiment, the biometric reference template 144 created is assigned a unique biometric reference template identifier 146 (also referred to herein as "template identifier") for uniquely identifying the biometric reference template 144 created using a person's biometric data 139. In an embodiment, the biometric data 139 processed from the person's biometric sample 132 is stored within the biometric reference template 144 as reference numeral 148. As shown in FIG. 1, in an embodiment, the biometric reference template 144 is signed with a digital signature 160 and the digital signature 160 for the biometric reference template 144 is detached from the biometric reference template 144. In an embodiment, the unique base template identifier 146 is created in the form of an information object identifier (OID) as defined in ISO/IEC 8824 and ISO/IEC 9834, a universally unique identifier (UUID) as defined in ISO/IEC 9834-8, or a uniform resource identifier (URI) as defined in RFC 2396. In an embodiment, the biometric data 148 stored within the biometric reference template 144 is encrypted or protected in some manner, such as signing the entire biometric reference template 144, as discussed further herein below. In an embodiment, the biometric reference template 144 includes one or more attributes (attribute 1, reference numeral 150, through attribute N, reference numeral 152) created for the reference template. Other components, such as, a "biometric type indicator" (reference numeral 149) that contains an indication of the type of biometric data (for example, fingerprint, iris or retinal scan, etc.) used to create the biometric reference template, is also included in the biometric reference template. In an embodiment, the biometric reference template 144 that is created using a biometric sample 132 provided by a user is stored in a biometric database 120 of the biometric system 102 along with other biometric reference templates 124 created for other users or individuals within the biometric system. In an embodiment, each of the biometric reference templates 124 stored within database 120 within the biometric system 102 is encrypted to protect the identities of the individuals that the biometric reference templates 124 belong to. Further, in an embodiment, each of the biometric reference templates is signed with a digital signature before being stored in the database 120, as discussed further herein below. In an embodiment, the digital signature(s) 129 are stored within database 120 of the computer system or server 102. It should be understood, however, that although not shown, other hardware and software components (e.g., additional computer systems, routers, firewalls, etc.) could be included in infrastructure 100.

Figure 2:
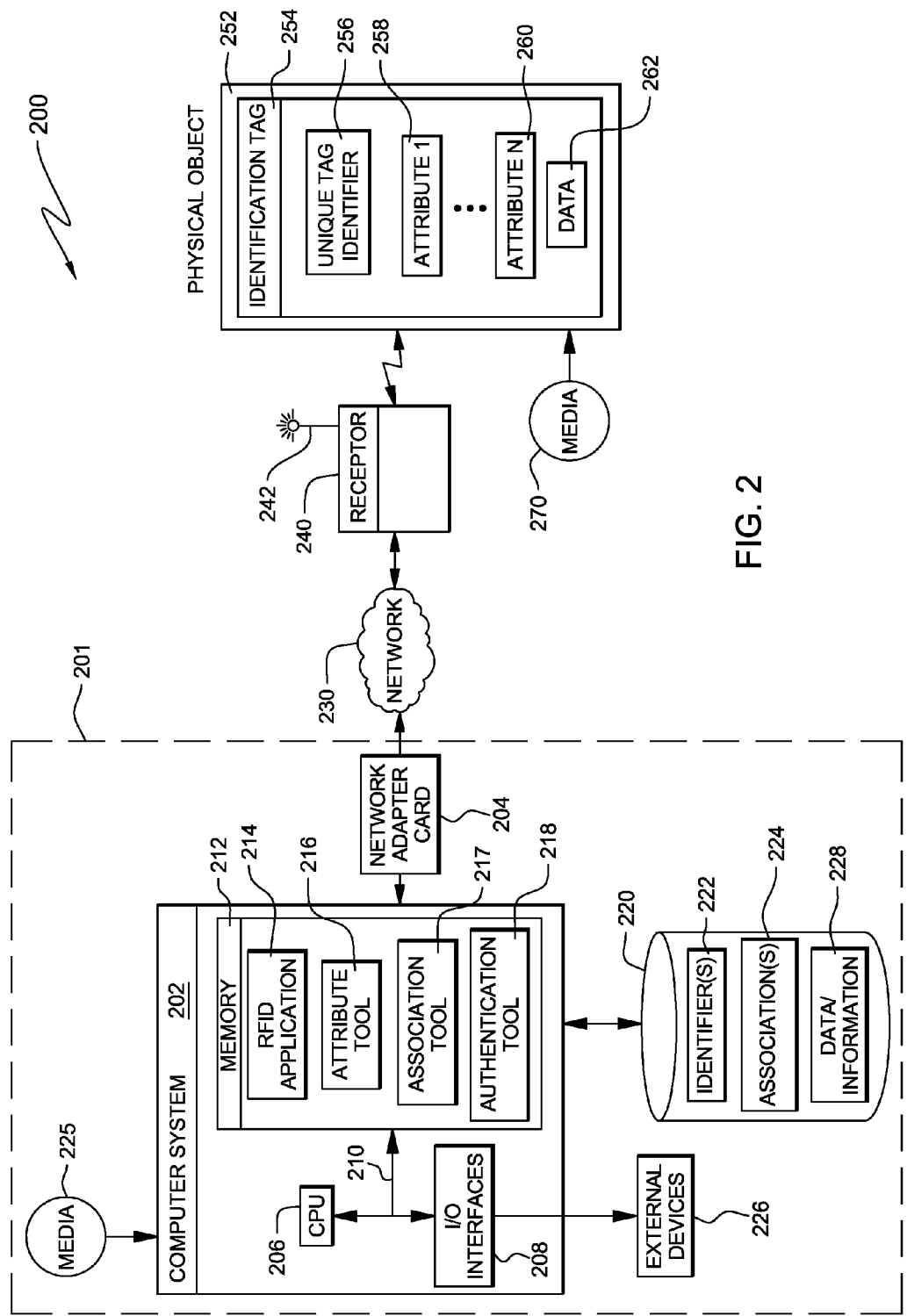
FIG. 2 is a block diagram depicting an embodiment of a computer infrastructure for associating a Radio Frequency Identification (RFID) tag for a physical object with a biometric reference template for an individual that has a relationship to the object, in accordance with an embodiment of the present invention.

Reference is now made to FIG. 2, which depicts an embodiment of a computer infrastructure 200 for creating a Radio Frequency Identification (RFID) tag (also referred to herein as "RFID tag" or "RFID" or simply as "tag") for a physical object and associating the RFID tag with a biometric reference template created using a biometric sample collected from an individual, in accordance with an embodiment of the present invention. In an embodiment, the RFID tag or device 254 attached to or embedded in a physical object 252 is an active RFID tag or identification tag 254 that comprises a microchip combined with an antenna in a compact unit that is equipped with a battery that provides a source of power for the RFID tag's circuitry and antenna. In another embodiment, the RFID tag 254 attached to or embedded in a physical object 252 is a chipless RFID tag (also known as RF fibers) that does not include any integrated circuit technology and instead comprises fibers that reflect a portion of the receptor or reader's radio-frequency signal back. Although the invention is described in terms of a Radio Frequency Identification (RFID) tag, it will be understood that an identification tag may include a bar code, a smart card, a chip card or an integrated circuit (ICC) having integrated circuits that can process data. As shown in FIG. 2, the RFID system infrastructure 200 includes a computer system 202 that is connected to a network 230. In an embodiment, as depicted in FIG. 2, computer system or server 202 is intended to represent any type of computer system that is maintained in a secure environment, that is, for which access control is enforced (as represented by the dotted lines indicated by reference numeral 201). In an embodiment, the computer system 202 is an information processing server that includes a RFID application 214 for programming RFID tags embedded in or attached to physical objects. Further, the computer system or server 202 is configured to work with RFID receptors that interrogate or query RFID tags associated with the RFID system 202. In an embodiment, the RFID application 214 deployed on the computer system or server 202 includes an attribute tool or program 216 for creating one or more attributes that are to be associated with the RFID tag, as discussed herein below. Further, in an embodiment, the computer system 202 includes an authentication tool 218 for signing attributes, as discussed further herein below. As shown in FIG. 2, the computer infrastructure 200 includes a receptor or reader or scanner 240 for receiving a tag identifier and other information from an identification tag 254 embedded in or affixed to a physical object 252. In an embodiment, the receptor 240 comprises a RFID receptor that has an antenna 242 that receives radio waves for reading or radiates radio waves for receiving a tag identifier and other information from a RFID tag 254. In an embodiment, the RFID tag 254 also comprises an antenna (not shown in any of the drawings). The RFID tag's antenna picks up the signals radiated from the RFID receptor or scanner or reader device 240 and the RFID tag 254 responds to the signal by sending data and/or information 262 stored within the RFID tag 254. Further, the receptor 240 transmits, via network 230, the data and/or information 262 read from the RFID tag 254 to the computer system 202 for storage. In an embodiment, the data and/or information received is stored within a database 220 associated with computer system or server 202, as shown by reference numeral 228 in database 220. In an embodiment, the RFID tag 254 embedded in or attached to the object 252 further includes a unique tag identifier or object identifier 256 that uniquely identifies the object 252 associated with the RFID tag 254. The RFID receptor 240 reads data and/or information 262 related to the unique tag identifier 256 within the identification tag 254. Further, the RFID tag 254 for the object 252 includes one or more attributes (attribute 1 through attribute N, reference numeral 258 through 260). For instance, an attribute may include a privacy policy identifier that uniquely identifies a privacy policy that is to be associated with the identification tag 254 for indicating a level of protection required for the data and/or information 262 contained in the RFID tag 254 and its proper and intended use by a recipient. Referring to FIG. 2, the computer system or server 202 is shown to include a CPU (Central CPU) 206, a memory 212, a bus 210, and input/output (I/O) interfaces 208. Further, the server 202 is shown in communication with external I/O devices/resources 226 and database 220. In general, CPU 206 executes computer program code stored in memory 212, such as the RFID application 214, the attribute tool 216 for creating or defining one or more attributes to be included in the RFID tag 254, an association tool 217 for creating one or more associations between an identification tag and a biometric reference template, and an authentication tool 218 for signing attributes that are created for an identification tag 254. In an embodiment, the one or more unique identifier(s) 222 that are associated with a RFID tag 254 are stored in database 220. Further, in an embodiment, any associations 224 formed using the association tool 217 are stored in database 220. Further, in an embodiment, any data and/or information 262 transmitted by the RFID tag 254 over the network 230 are stored in database 220, referenced by reference numeral 228. In general, CPU 206 executes computer program code stored in memory 212, such as the RFID application 214 and/or the attribute tool 216 for creating attributes for an identification tag 254, where the attribute may contain, for example, a privacy policy identifier for identifying a privacy policy that is associated with the RFID tag 254. While executing the RFID application or program 214 on the computer system or server 202, the CPU 206 can read and/or write data, to/from memory 212, database 220, and/or I/O interfaces 208, such as, the data and/or information 228 stored in database 220. Alternatively, the RFID application 214 may store the data and/or information in memory 212. Bus 210 provides a communication link between each of the components in computer system 202, such that information can be communicated within the infrastructure 200. External devices 226 can comprise any devices (e.g., keyboard, pointing device, display, etc.) that enable a user to interact with computer system 202 and/or any devices (e.g., network card, modem, etc.) that enable the system 202 to communicate with one or more other computing devices, such as, the receptor 240 and/or the identification tag 254. The attribute tool 216 and/or the authentication tool 218 can be loaded into memory 212 of the computer system 202 from a computer readable storage medium or media (reference numeral 225), such as, a magnetic tape or disk, optical media, DVD, memory stick, semiconductor memory, etc. or downloaded from the server via a network adapter card (reference numerals 204) installed on the computer system or server 202. Similarly, the attributes created by the computer system 202 for a RFID or identification tag 254 can be loaded onto the tag 254 using a storage medium or media (reference numeral 270). It should be understood, however, that although not shown, other hardware and software components (e.g., additional computer systems, routers, firewalls, etc.) could be included in infrastructure 200. Further, although the computer infrastructure 100 is shown as being separate from the computer infrastructure 200, it will be understood by one skilled in the art that the biometric system and the RFID system can be deployed on the same computer system or server.

Figure 3:
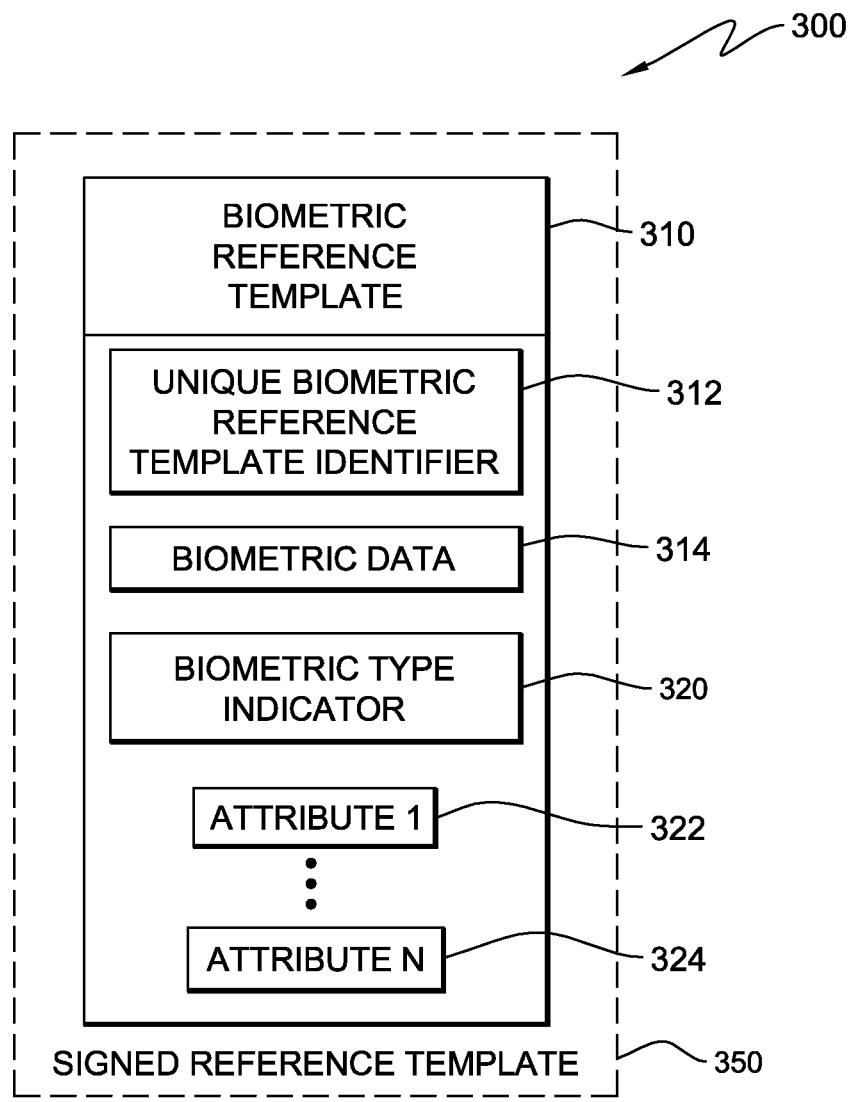
FIG. 3 is a block diagram depicting an embodiment of a signed biometric reference template that contains one or more attributes, in accordance with an embodiment of the present invention.

Reference is now made to FIG. 3, reference numeral 300, which depicts elements or components of a signed biometric reference template that is to be associated with a RFID tag, in accordance with respective embodiments of the present invention. Turning to FIG. 3, reference numeral 300 shows an embodiment of a signed biometric reference template that is to be associated with a RFID tag embedded in or attached to a physical object. In particular, as shown by the dotted lines 350 in FIG. 3, the biometric reference template 310, is signed using a digital signature provided by the authentication tool 118 (shown in FIG. 1), as explained herein below. In an embodiment, the biometric reference template 310 includes a unique biometric reference template identifier 312 (also referred to herein as "biometric reference template identifier" or "biometric identifier" or "template identifier") that uniquely identifies the biometric reference template 310 belonging to an individual. Further, in an embodiment, the biometric reference template 310 includes biometric data 314, that is, data processed from a biometric sample collected from an individual using a biometric application. Furthermore, the biometric reference template 310 includes a "biometric type indicator" component (reference numeral 320) that contains an indication of the type of biometric data (for example, fingerprint, iris or retinal scan, etc.) used to create the biometric reference template. Further, one or more attributes (attribute 1, reference numeral 322, through attribute N, reference numeral 324) are created for the biometric reference template, using the attribute tool 116 in FIG. 1. In an embodiment, to form a digital signature on an information object, such as, a biometric reference template, a cryptographic hash (also referred to herein as "encrypted hash" or "hash value" or simply "hash") is computed over the entire object or biometric reference template and then the hash is signed. For instance, where a RSA digital signature scheme is used to sign a biometric reference template, a key is used to encrypt the hash to form the digital signature. Furthermore, in an embodiment, the signed biometric reference template 350 is stored with other biometric reference templates 124 in database 120 (FIG. 1). Additionally, the digital signature used to sign the biometric reference template 310 is stored with other signature(s) 129 in a database, for instance, database 120, as shown in FIG. 1. In an embodiment, as shown in FIG. 3, the digital signature (reference numeral 350) is appended to a biometric reference template 310 (as shown in FIG. 3) and the biometric reference template along with the digital signature may be stored in a database within a biometric system. In an alternate embodiment, the digital signature may be detached from the biometric reference template, as shown by reference numeral 160 in FIG. 1. Similarly, any of the attributes created for the biometric reference template may be detached from the biometric reference template and not included within the biometric reference template 310, as shown. The use of digital signatures to sign objects to be authenticated is well known in the art and, as such, will not be discussed further herein. For instance, if a RSA algorithm is used to sign the hash, a private key is used to encrypt the hash to form the digital signature, which is then decrypted by a relying party using their associated public key. However, the template identifier 312 within the biometric reference template 310 that uniquely identifies the biometric reference template can be cryptographically bound to an attribute using other methods, such as a Message Authentication Code (MAC) or encryption. Moreover, the biometric reference template 310 containing the attribute 322-324 need not be signed when used in a context in which a trust relationship has been established. However, when trust by a third party is needed, the hash of the biometric reference template containing the privacy policy attribute is signed (using an authentication tool 118 as shown in FIG. 1) and is included in the biometric reference template as a component of the signed biometric reference template. When the signature is validated and trust in the signed information is established, the relying party is assured that the information contained in the attribute is for a given biometric reference template, since the signature 350 covers the hash of the biometric reference template 310 which includes any attributes and the relying party can compare this signed hash to ensure that the hash is identical to a hash the relying party computes over the biometric reference template that contains one or more attributes.

Figure 4A:
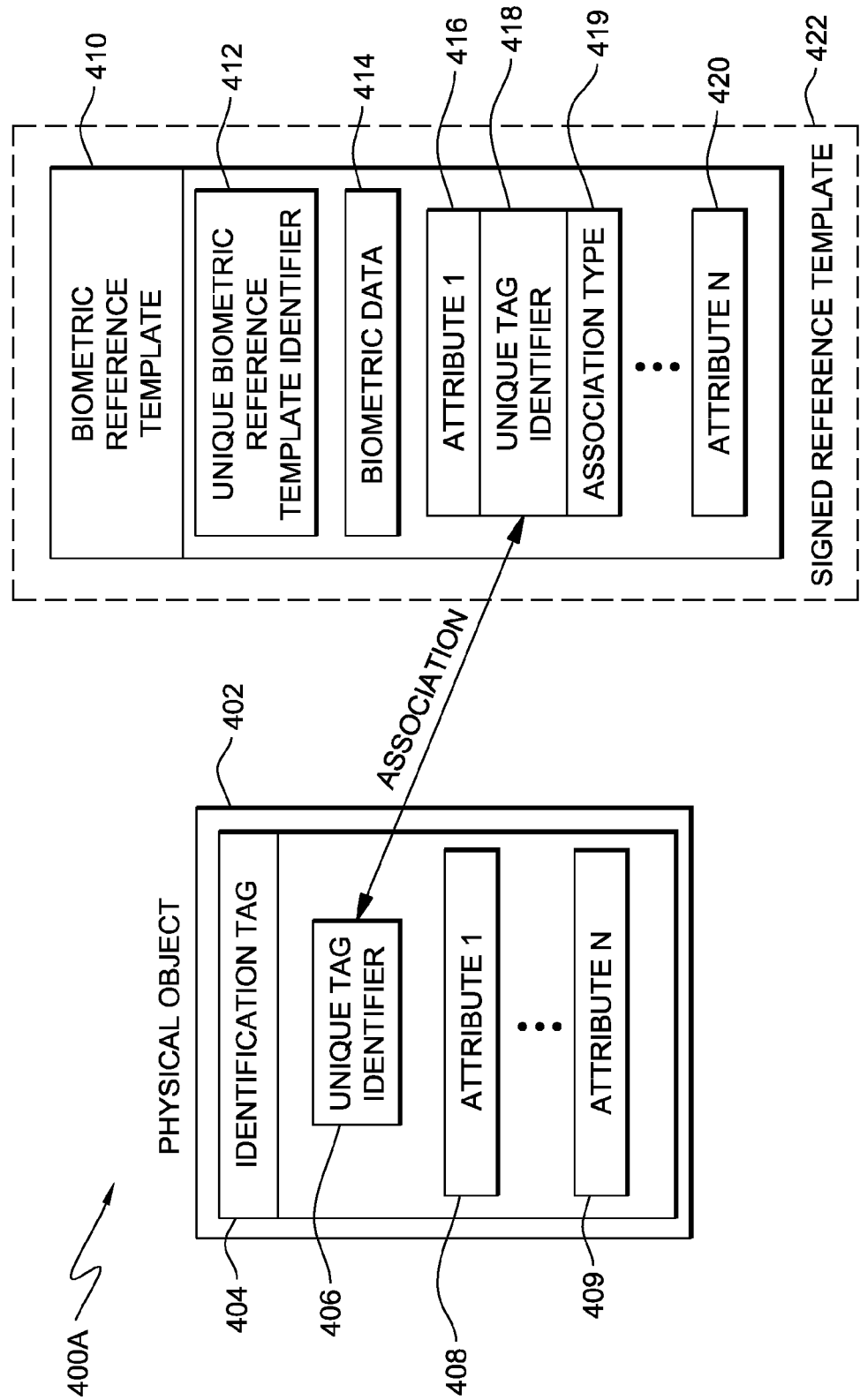
FIGS. 4A-4C depict different embodiments for associating an attribute created for a RFID tag embedded in or attached to a physical object with an attribute created for a biometric reference template corresponding to an individual, in accordance with embodiments of the present invention.
Figure 4B:
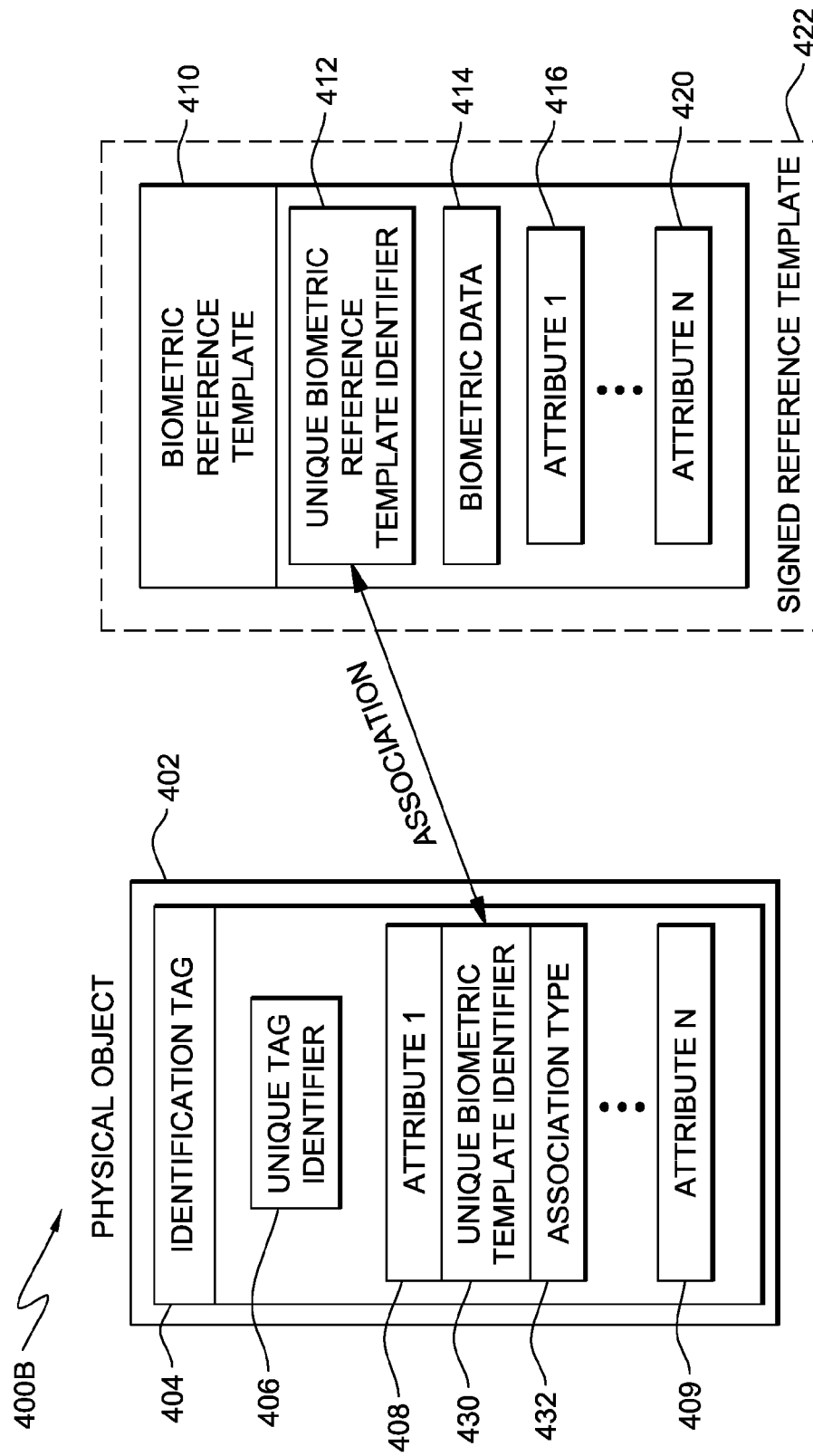
Figure 4C:
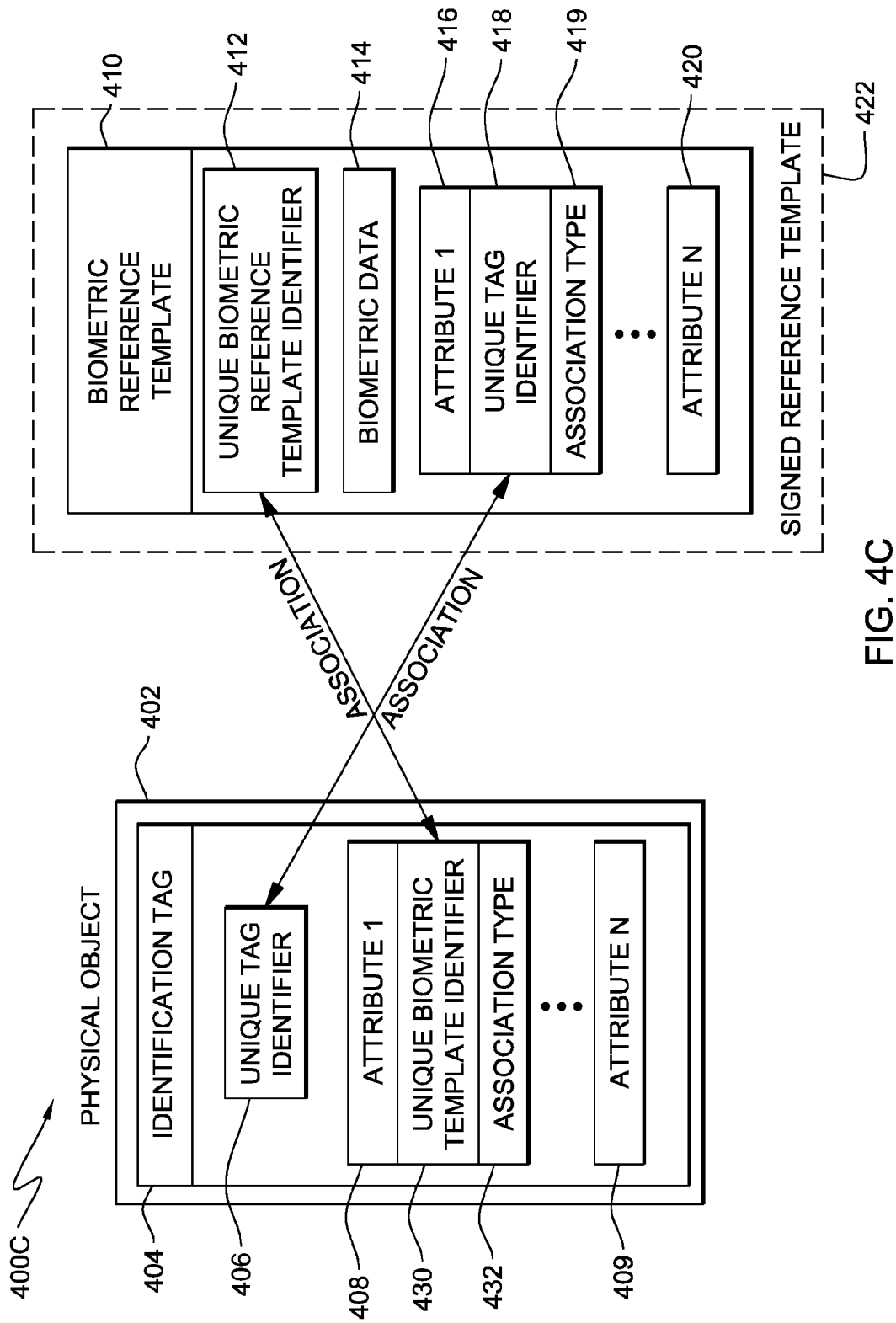

Reference is now made to FIGS. 4A-4C., which depict different embodiments for associating an attribute created for a RFID tag embedded in or attached to a physical object with an attribute created for a biometric reference template corresponding to an individual, in accordance with embodiments of the present invention. As such, components that are the same in each of FIGS. 4A, 4B and 4C are labeled with the same reference numerals. Turning to FIG. 4A, reference numeral 400A, depicts one embodiment of associating an identification tag, such as, a RFID tag embedded in or affixed to a physical object with a biometric reference template, in accordance with an embodiment. As shown in FIG. 4A, an identification tag, such as, a RFID tag, reference numeral 404 is embedded in or attached to a physical object 402. Further, the identification tag 404 contains a unique tag identifier 406 that uniquely identifies the object that the tag is embedded in or attached to. In an embodiment, the identification tag 404 contains one or more attributes (attribute 1, reference numeral 408 through attribute N, reference numeral 409) that are defined to contain information or data. For instance, an attribute can be defined as a privacy policy attribute, where the attribute contains a privacy policy identifier that identifies a privacy policy that sets forth the proper use and handling of information transmitted by the RFID tag. Further, as shown in FIG. 4A, the identification tag 404 is associated with a biometric reference template 410. In an embodiment, the biometric reference template 410 contains a unique biometric reference template identifier 412 that identifies a biometric reference template belonging to an individual. Further, the biometric reference template 410 includes biometric data 414 that is data processed from a biometric sample provided by the individual corresponding to the biometric reference template 410. Furthermore, the biometric reference template 410 includes one or more attributes (attribute 1, reference numeral 416 through attribute N, reference numeral 420). In an embodiment, attribute 1, reference numeral 416 in the biometric reference template 410 contains a unique tag identifier 418, which is the same unique tag identifier 406 that is contained in the identification tag 404 embedded in or attached to the physical object 402. Further, the attribute 1 (reference numeral 416) in the biometric reference template 410 contains an association type component, reference numeral 419, which specifies the type of association between the unique tag identifier 418 and the biometric reference template 410. In an embodiment, the association type component is created using the association tool 117 shown in FIG. 1. For instance, if the physical object 402 is a vehicle and the biometric reference template 410 belongs to the vehicle's owner, this type of association may be specified in the association type component 419. Additionally, as shown in FIG. 4A, the biometric reference template 410 is signed (indicated by the dotted lines 422) with a digital signature as described herein above. Accordingly, the placing of the unique tag identifier 406 for the physical object within an attribute 416 of the biometric reference template 410 (that is, the unique tag identifier reference numeral 418) creates an association between the physical object 402 and the individual corresponding to the biometric reference template 410.

Turning to FIG. 4B, reference numeral 400B, depicts another embodiment of associating an identification tag, such as, a RFID tag embedded in or affixed to a physical object with a biometric reference template, in accordance with an embodiment. As shown in FIG. 4B, an identification tag, such as, a RFID tag, reference numeral 404 is embedded in or attached to a physical object 402. Further, the identification tag 404 contains a unique tag identifier 406 that uniquely identifies the physical object that the tag is embedded in or attached to. In an embodiment, the identification tag 404 contains one or more attributes (attribute 1, reference numeral 408 through attribute N, reference numeral 409) that are defined to contain information or data. As shown in FIG. 4B, the attribute 1 (reference numeral 408 contains a unique biometric reference template identifier 430 that identifies a biometric reference template 410 corresponding to an individual whose biometric sample was collected and processed. Further, the attribute 1 (reference numeral 408) in the identification tag or RFID tag 404 contains an association type component, reference numeral 432, which specifies the type of association between the unique biometric reference template identifier 430 and the physical object 402. In an embodiment, the association type component is created using the association tool 217 shown in FIG. 2. For instance, if the physical object 402 is a vehicle and the biometric reference template 410 belongs to the vehicle's owner, this type of association may be specified in the association type component 432. Furthermore, the identification tag 404 may contain additional attributes, such as, a privacy policy attribute, where the attribute contains a privacy policy identifier that identifies a privacy policy that sets forth the proper use and handling of information transmitted by the RFID tag. Further, as shown in FIG. 4B, the unique biometric reference template identifier 430 placed within the identification tag or RFID 404 is the same unique biometric reference template identifier 412 that is placed in the biometric reference template 410. In an embodiment, the unique biometric reference template identifier 412 identifies the biometric reference template 410 belonging to an individual. Further, the biometric reference template 410 includes biometric data 414, which is data processed from a biometric sample provided by the individual corresponding to the biometric reference template 410. Furthermore, the biometric reference template 410 includes one or more attributes (attribute 1, reference numeral 416 through attribute N, reference numeral 420). For instance, attribute 1, reference numeral 416 in the biometric reference template 410 may contain a unique privacy policy identifier, which identifies a privacy policy that is associated with the biometric reference template 410, setting forth the proper use and handling of the information contained in the biometric reference template 410. Additionally, as shown in FIG. 4B, the biometric reference template 410 is signed (indicated by the dotted lines 422) with a digital signature as described herein above. Accordingly, the placing of the unique biometric reference template identifier 430 within an attribute (reference numeral 408) of the identification tag 404 embedded in or attached to the physical object, which is the same unique biometric reference template identifier 412 contained within the biometric reference template 410, creates an association between the physical object 402 and the individual corresponding to the biometric reference template 410.

Turning to FIG. 4C, reference numeral 400C, depicts another embodiment of associating an identification tag, such as, a RFID tag embedded in or affixed to a physical object with a biometric reference template, in accordance with an embodiment. As shown in FIG. 4C, an identification tag, such as, a RFID tag, reference numeral 404 is embedded in or attached to a physical object 402. Further, the identification tag 404 contains a unique tag identifier 406 that uniquely identifies the physical object that the tag is embedded in or attached to. In an embodiment, the identification tag or RFID 404 contains one or more attributes (attribute 1, reference numeral 408 through attribute N, reference numeral 409) that are defined to contain information or data. As shown in FIG. 4C, the attribute 1 (reference numeral 408) contains a unique biometric reference template identifier 430 that identifies a biometric reference template 410 corresponding to an individual whose biometric sample was collected and processed. Further, the attribute 1 (reference numeral 408) in the identification tag or RFID tag 404 contains an association type component, reference numeral 432, which specifies the type of association between the unique biometric reference template identifier 430 and the physical object 402. In an embodiment, the association type component is created using the respective association tool (reference numeral 117 and 217) shown in FIGS. 1 and 2. For instance, if the physical object 402 is a vehicle and the biometric reference template 410 belongs to the vehicle's owner, this type of association may be specified in the association type component 432. Furthermore, the identification tag 404 may contain additional attributes, such as, a privacy policy attribute, where the attribute contains a privacy policy identifier that identifies a privacy policy that sets forth the proper use and handling of information transmitted by the RFID tag. Further, as shown in FIG. 4C, the unique biometric reference template identifier 430 placed within the identification tag or RFID 404 is the same unique biometric reference template identifier 412 that is placed in the biometric reference template 410. In an embodiment, the unique biometric reference template identifier 412 and/or 430 identifies the biometric reference template 410 belonging to an individual. Further, the biometric reference template 410 includes biometric data 414, which is data processed from a biometric sample provided by the individual corresponding to the biometric reference template 410. Additionally, the biometric reference template 410 includes one or more attributes (attribute 1, reference numeral 416 through attribute N, reference numeral 420). Further, as shown in FIG. 4C, the identification tag 404 is associated with a biometric reference template 410. In an embodiment, the biometric reference template contains a unique biometric reference template identifier 412 that identifies a biometric reference template belonging to an individual. Further, the biometric reference template 410 includes biometric data 414 that is data processed from a biometric sample provided by the individual corresponding to the biometric reference template 410. Furthermore, the biometric reference template 410 includes one or more attributes (attribute 1, reference numeral 416 through attribute N, reference numeral 420). In an embodiment, attribute 1, reference numeral 416 in the biometric reference template 410 contains a unique tag identifier 418, which is the same unique tag identifier 406 that is contained in the identification tag 404 embedded in or attached to the physical object 402. Further, the attribute 1 (reference numeral 416) in the biometric reference template 410 contains an association type, reference numeral 419, which specifies the type of association between the unique tag identifier 418 and the biometric reference template 410. For instance, if the physical object 402 is a vehicle and the biometric reference template 410 belongs to the vehicle's owner, this type of association may be specified in the association type component 419. Further, other attributes can be created for the biometric reference template 410. For instance, attribute N, reference numeral 420 in the biometric reference template 410 may contain a unique privacy policy identifier, which identifies a privacy policy that is associated with the biometric reference template 410, setting forth the proper use and handling of the information contained in the biometric reference template 410. Additionally, as shown in FIG. 4C, the biometric reference template 410 is signed (indicated by the dotted lines 422) with a digital signature as described herein above. Accordingly, the placing of the unique tag identifier 406 for the physical object within an attribute 416 of the biometric reference template 410 (which is the same unique biometric reference template identifier reference numeral 418) and the placing of the unique biometric reference template identifier 430 (which is the same unique biometric reference template identifier 412 contained within the biometric reference template 410) creates an association between the physical object 402 and the individual corresponding to the biometric reference template 410.

Figure 5:
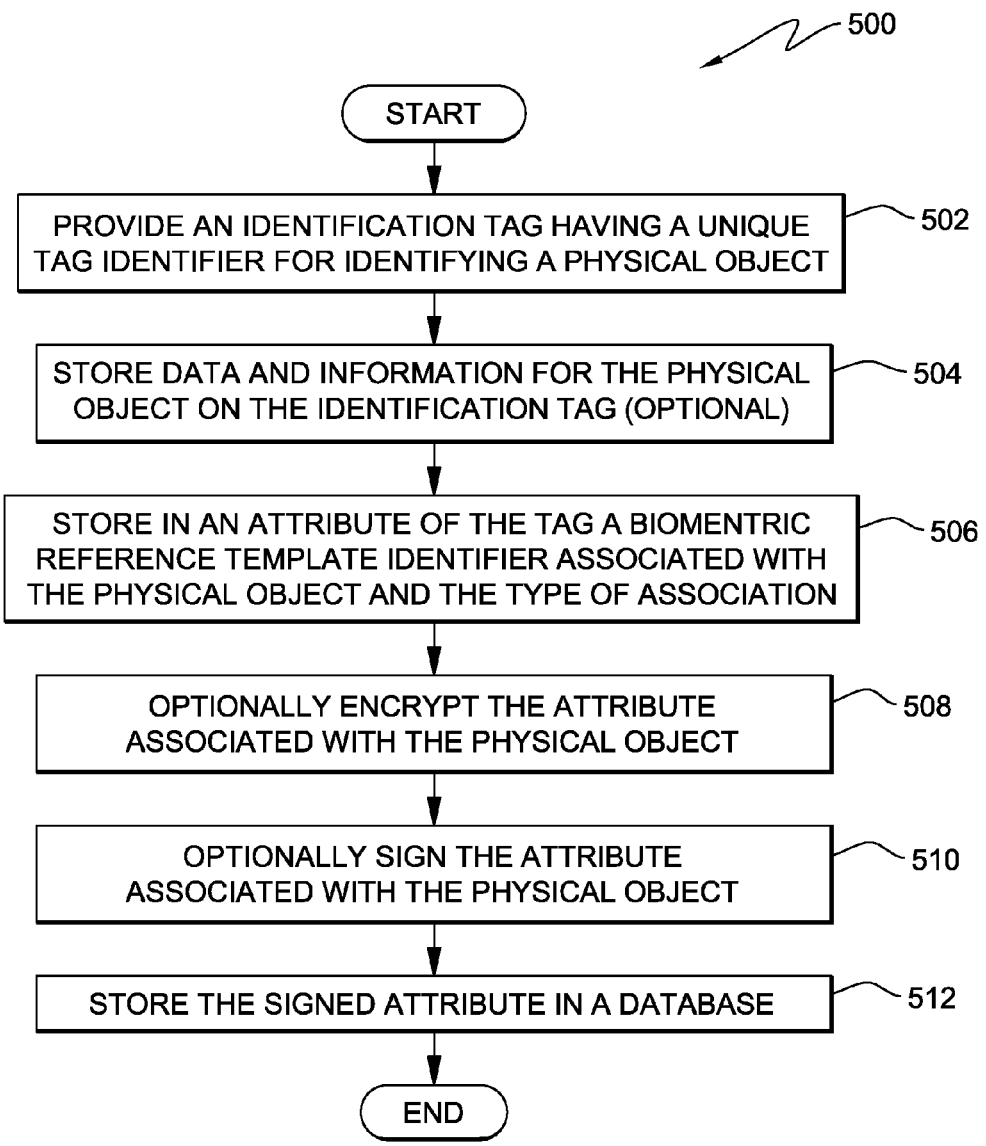
FIG. 5 depicts a flowchart outlining the steps for creating an attribute for a RFID tag embedded in or attached to a physical object, where the attribute contains a biometric reference template identifier for a biometric reference template that is to be associated with the RFID tag, in accordance with an embodiment of the invention.

In another embodiment, the invention provides a method for creating an attribute for a RFID tag embedded in or attached to a physical object, where the attribute contains a biometric reference template identifier for a biometric reference template that is to be associated with the RFID tag, in accordance with an embodiment of the invention. Reference is now made to FIG. 5, reference numeral 500, which depicts a flowchart outlining the method steps for providing a Radio Frequency Identification (RFID) tag attached to or embedded in a physical object that includes an attribute that contains an association between the physical object and a biometric reference template belonging to an individual, in accordance with an embodiment of the present invention. Turning to FIG. 5, reference numeral 500, the method begins with providing, in step 502, an identification tag, for instance, a RFID tag that has a unique tag identifier for uniquely identifying a physical object that the identification tag is attached to or embedded in. In an embodiment, in step 504, data and information for the physical object is stored on the RFID tag. Further, in step 506, a biometric reference template identifier to be associated with the physical object is stored in an attribute created for the RFID tag, along with the type of association. In an embodiment, in step 508, the attribute contained in the tag embedded in or attached to the physical object and containing the biometric reference template identifier is encrypted. Further, in step 510, in an embodiment, the attribute contained in the tag embedded in or attached to the physical object is signed with a digital signature. In step 512, the signed attribute of the tag is stored in a database. In an embodiment, a globally unique biometric reference template identifier is used to indicate a particular biometric reference template belonging to an individual. As mentioned herein above, the biometric reference template identifier could be created in the form of an information object identifier (OID) as defined in ISO/IEC 8824 and ISO/IEC 9834, a universally unique identifier (UUID) as defined in ISO/IEC 9834-8, a uniform resource identifier (URI) as defined in RFC 2396, a cryptographic hash of the biometric reference template, a digital signature over the biometric reference template, or some other means of uniquely naming the biometric reference template. When OIDs, UUIDs, or URIs are used for creating biometric reference template identifiers, these indicators could be included in the RFID tag information.

Figure 6:
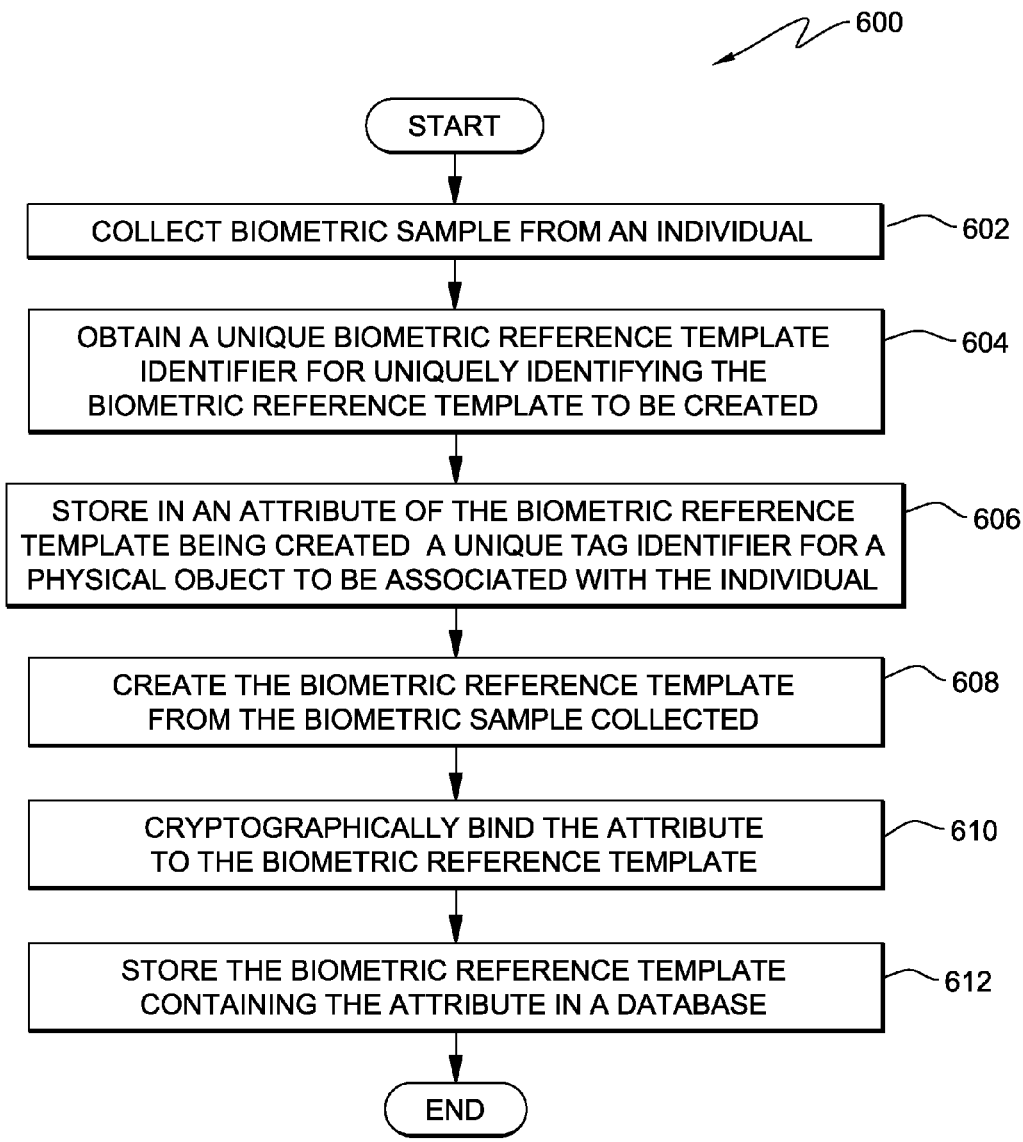
FIG. 6 depicts a flowchart outlining the steps for creating an attribute for a biometric reference template corresponding to an individual, where the attribute contains a identification tag identifier or RFID identifier for the identification tag or RFID tag embedded in or attached to a physical object, and where the biometric reference template is to be associated with the RFID tag, in accordance with various embodiments of the present invention.

Reference is now made to FIG. 6, reference numeral 600, which outlines the steps for creating an attribute for a base biometric reference template belonging to an individual, where the attribute contains a unique tag identifier or RFID identifier embedded in or attached to a physical object to be associated with the individual, in accordance with an embodiment of the invention. Referring to FIG. 6, the process begins with a biometric application within a biometric reader or scanner device collecting in step 602 a biometric sample from an individual to create a biometric reference template within the biometric system. In step 604, a unique biometric reference template identifier is assigned to or obtained for the biometric reference template being created. Further, in step 606, a unique tag identifier for an identification tag or RFID tag is stored in an attribute created for the biometric reference template. In an embodiment, the unique tag identifier identifies the identification tag or RFID tag embedded in or attached to the physical object and which is to be associated with the individual whose biometric sample is collected. In step 608, the biometric reference template is created using the biometric sample collected from the individual. In step 610, the biometric application cryptographically binds the attribute containing the unique identification tag identifier to other information in the biometric reference template. Further, the biometric reference template containing the attribute is stored in a database in step 612, ending the process.

Figure 7:
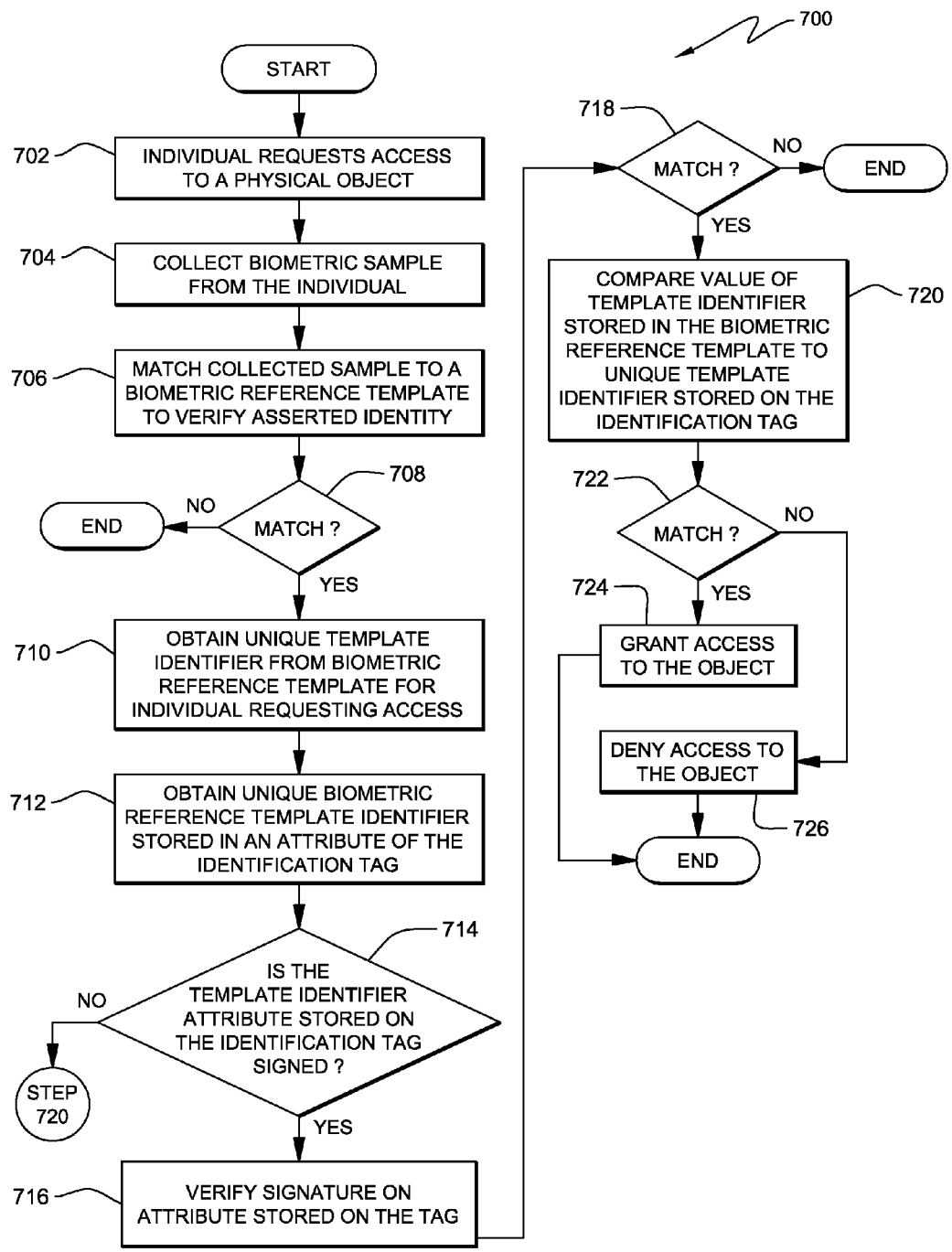
FIG. 7 depicts a flowchart outlining the steps for processing a request from an individual seeking access to a physical object, where the individual's biometric reference template is associated with the object, in accordance with an embodiment of the present invention.

Turning to FIG. 7, reference numeral 700 depicts a flowchart outlining the steps for processing a request received from an individual seeking access to a physical object, in accordance with an embodiment of the present invention. The method begins in step 702 with an individual requesting from a biometric service provider access to a physical object by asserting his or her identity. The individual provides a biometric sample in step 704 to the biometric service provider. The biometric service provider retrieves or obtains the biometric reference template corresponding to the individual whose identity is asserted and matches the collected sample to a biometric reference template in step 706. In step 708, the biometric service provider uses a biometric application to determine whether or not the collected sample matches the biometric reference template stored in the biometric system. If the collected sample does not match the biometric reference template stored in the biometric system, then the process ends. However, if the collected sample matches the biometric reference template in step 708, then in step 710, the biometric service provider obtains the unique biometric reference template identifier from the biometric reference template for the individual requesting access. Further, in step 712, the biometric service provider obtains the unique biometric reference template identifier stored in an attribute of the identification tag. In step 714, a determination is made by the biometric system as to whether or not the template identifier attribute stored on the identification tag is signed. If the template identifier attribute stored on the identification tag is determined to be not signed, then the process continues at step 720. However, if the template identifier attribute stored on the identification tag is determined to be signed, then in step 716, the biometric system verifies the signature on the attribute stored on the identification tag. In an embodiment, in step 718, the signature is compared to a signature stored in a database. If the signature on the attribute stored on the identification tag does not match the signature stored in the database, then the process ends. However, if the signature on the attribute stored on the identification tag matches the signature stored in the database, then in step 720, the value of the unique template identifier stored in the biometric reference template is compared to the unique template identifier stored on the identification tag. Further, a determination is made in step 722 as to whether or not the value of the unique template identifier stored in the biometric reference template matches the value of the unique template identifier stored on the identification tag. If the value of the unique template identifier stored in the biometric reference template matches the unique template identifier stored on the identification tag, then the individual is granted access to the object in step 724, ending the process. However, if the value of the unique template identifier stored in the biometric reference template does not match the unique template identifier stored on the identification tag, then the individual is denied access to the object in step 726, ending the process.

Accordingly, the invention provides a system, method and a program product for associating a biometric reference template corresponding to an individual with a Radio Frequency Identification (RFID) tag embedded in or attached to a physical object. A biometric reference template can be associated with an RFID in different ways and the association itself may be external and distinct from the template and the RFID, appended to the template or RFID, or included in the template or RFID. The unique identifier value of an RFID or the RFID information can be cryptographically bound to a reference template using a hash, digital signature, Message Authentication Code (MAC), or encryption. The RFID identifier value or the RFID information can be associated with a biometric template by placing the RFID identifier or the RFID information along with the template in a file, file record, or database, or by placing the template and RFID identifier or RFID information together in the storage area of any device, or on any form of media. One instance of the RFID identifier or RFID information can be associated with one or more biometric templates, or one instance of a biometric template can be associated with one or more instances of an RFID identifier or RFID information. A biometric template and RFID association can be implemented in software as a signed attribute as defined in the X Cryptographic Message Syntax (CMS) and X XML CMS standards, as a SAML (Security Assertion Markup Language) assertion, so that they can be used in web services tokens, as defined in ITU-T Recommendation X.1141 and the OASIS SAML standards, as an attribute in an X.509 Attribute Certificate, or as a field in a DB2 database record. Regardless of implementation format, a simple association would contain at a minimum a value that uniquely identifies a biometric template (and by proxy, an individual) and a value that uniquely identifies an RFID (and by proxy, a physical object). Additionally, an association could contain an indication of the relationship between an individual and an object, for example, owner-object, lessor-lessee, parent-child, master-pet, author-document, etc. Though there are many possible definitions, one abstract syntax representation of an association between one individual and a set of one or more objects could be:

```
Association ::= SEQUENCE {
    biometricTemplateID DigestedData, -- Cryptographic hash of a
    biometric template rfidSet SET SIZE(1..MAX) OF RFID }
```

Here a unique cryptographic hash of a biometric template identifies an individual as being associated in some manner with one or more physical objects. An alternative definition could allow a set of values of type DigestedData to represent a group of biometric templates, all belonging to a single individual (to support multimodal biometrics or a set of revocable biometrics), or with each template in the set belonging to a distinct individual. Thus, associations such as group ownership, group responsibility, or group rights to perform some action on an object could be represented. As example, consider that a group of individuals, each with a unique biometric template are allowed to edit a document identified by an embedded RFID. The group of individuals component of such an association could be represented as a "SET SIZE(1 . . . MAX) OF DigestedData", and the document could be represented as a "SET SIZE(1) OF RFID". For the purposes of compliance and audit, a trained practitioner can use an association, along with the security policies and practices of the organization, to determine if the organization effectively maintains the rights or requirements provided for a given relationship. As example, the rights of an owner exert control over an object.

The foregoing descriptions of specific embodiments of the present invention have been presented for the purpose of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for associating a biometric reference template with an identification tag for a physical object, said method comprising:

ascertaining, by a processor of a computer system, that an attribute comprised by the identification tag is signed with a digital signature, said attribute comprising a privacy policy identifier which identifies a privacy policy pertaining to the identification tag, said identification tag embedded in or attached to a physical object, said identification tag comprising a first biometric reference template identifier that uniquely identifies biometric data pertaining to a person, said biometric reference template comprising a second biometric reference template identifier that uniquely identifies the biometric data;

said processor confirming that the digital signature matches a signature stored in a database of the computer system; and said processor verifying that the first biometric reference template identifier matches the second biometric reference template identifier.

2. The method of claim 1, wherein the identification tag further comprises a unique tag identifier for identifying the physical object, and wherein the biometric reference template further comprises the unique tag identifier.

3. The method of claim 2, wherein the biometric reference template further comprises an association type component which specifies a type of association between the unique tag identifier and the biometric reference template.

4. The method of claim 1, wherein the biometric reference template further comprises the biometric data, and wherein the method further comprises:

prior to said verifying and in response to a request by the person to access the physical object, said processor determining that a biometric sample provided by the person in conjunction with the request to access the physical object matches the biometric data comprised by the biometric reference template; and in response to said verifying, said processor granting the person access to the physical object.

5. The method of claim 1, wherein the biometric reference template further comprises a biometric type indicator that indicates a type of the biometric data.

6. The method of claim 1, wherein the identification tag further comprises an association type component which specifies a type of association between the first biometric reference template identifier and the physical object.

7. The method of claim 1, wherein the identification tag is a Radio Frequency IDentification (RFID) tag.

8. The method of claim 2, wherein the physical object is a vehicle, and wherein the person is an owner of the vehicle.

9. A computer program product, comprising a computer readable physically tangible storage device having a computer readable program code stored therein, said program code configured to be executed by a processor of a computer system to implement a method for associating a biometric reference template with an identification tag for a physical object, said method comprising:

said processor ascertaining that an attribute comprised by the identification tag is signed with a digital signature, said attribute comprising a privacy policy identifier which identifies a privacy policy pertaining to the identification tag, said identification tag embedded in or attached to a physical object, said identification tag comprising a first biometric reference template identifier that uniquely identifies biometric data pertaining to a person, said biometric reference template comprising a second biometric reference template identifier that uniquely identifies the biometric data;

said processor confirming that the digital signature matches a signature stored in a database of the computer system; and said processor verifying that the first biometric reference template identifier matches the second biometric reference template identifier.

10. The computer program product of claim 9, wherein the identification tag further comprises a unique tag identifier for identifying the physical object, and wherein the biometric reference template further comprises the unique tag identifier.

11. The computer program product of claim 10, wherein the biometric reference template further comprises an association type component which specifies a type of association between the unique tag identifier and the biometric reference template.

12. The computer program product of claim 9, wherein the biometric reference template further comprises the biometric data, and wherein the method further comprises:

prior to said verifying and in response to a request by the person to access the physical object, said processor determining that a biometric sample provided by the person in conjunction with the request to access the physical object matches the biometric data comprised by the biometric reference template; and in response to said verifying, said processor granting the person access to the physical object.

13. The computer program product of claim 9, wherein the biometric reference template further comprises a biometric type indicator that indicates a type of the biometric data.

14. The computer program product of claim 9, wherein the identification tag further comprises an association type component which specifies a type of association between the first biometric reference template identifier and the physical object.

15. A computer system comprising a processor, a memory coupled to the processor, and a computer readable storage device coupled to the processor, said storage device containing program code configured to be executed by the processor via the memory to implement a method for associating a biometric reference template with an identification tag for a physical object, said method comprising:

said processor ascertaining that an attribute comprised by the identification tag is signed with a digital signature, said attribute comprising a privacy policy identifier which identifies a privacy policy pertaining to the identification tag, said identification tag embedded in or attached to a physical object, said identification tag comprising a first biometric reference template identifier that uniquely identifies biometric data pertaining to a person, said biometric reference template comprising a second biometric reference template identifier that uniquely identifies the biometric data;

said processor confirming that the digital signature matches a signature stored in a database of the computer system; and said processor verifying that the first biometric reference template identifier matches the second biometric reference template identifier.

16. The computer system of claim 15, wherein the identification tag further comprises a unique tag identifier for identifying the physical object, and wherein the biometric reference template further comprises the unique tag identifier.

17. The computer system of claim 16, wherein the biometric reference template further comprises an association type component which specifies a type of association between the unique tag identifier and the biometric reference template.

18. The computer system of claim 15, wherein the biometric reference template further comprises the biometric data, and wherein the method further comprises:

prior to said verifying and in response to a request by the person to access the physical object, said processor determining that a biometric sample provided by the person in conjunction with the request to access the physical object matches the biometric data comprised by the biometric reference template; and in response to said verifying, said processor granting the person access to the physical object.

19. The computer system of claim 15, wherein the biometric reference template further comprises a biometric type indicator that indicates a type of the biometric data.

20. The computer system of claim 15, wherein the identification tag further comprises an association type component which specifies a type of association between the first biometric reference template identifier and the physical object.

* * * * *